(12) United States Patent
Herz

(10) Patent No.: US 8,196,169 B1
(45) Date of Patent: Jun. 5, 2012

(54) COORDINATE-BASED SET TOP BOX POLICY ENFORCEMENT SYSTEM, METHOD AND COMPUTER PROGRAM PRODUCT

(75) Inventor: William S. Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 210 days.

(21) Appl. No.: 11/532,817

(22) Filed: Sep. 18, 2006

(51) Int. Cl.
*G06F 3/00* (2006.01)
*G06F 13/00* (2006.01)
*H04N 5/445* (2011.01)
*H04N 7/16* (2011.01)

(52) U.S. Cl. .......................................... 725/48; 725/25

(58) Field of Classification Search ............... 725/48, 725/133, 141, 153, 25–31, 78; 370/254
See application file for complete search history.

(56) References Cited

U.S. PATENT DOCUMENTS

| | | | |
|---|---|---|---|
| 5,432,542 A * | 7/1995 | Thibadeau et al. | 725/35 |
| 5,621,793 A * | 4/1997 | Bednarek et al. | 380/240 |
| 5,781,150 A * | 7/1998 | Norris | 342/357.34 |
| 6,009,116 A * | 12/1999 | Bednarek et al. | 375/130 |
| 6,108,365 A * | 8/2000 | Rubin et al. | 375/130 |
| 6,124,900 A | 9/2000 | Clatanoff et al. | |
| 6,457,129 B2 * | 9/2002 | O'Mahony | 726/4 |
| 6,728,317 B1 | 4/2004 | Demos | |
| 6,809,775 B2 * | 10/2004 | Yule | 348/553 |
| 7,058,358 B2 * | 6/2006 | Cannon et al. | 455/41.2 |
| 7,080,402 B2 * | 7/2006 | Bates et al. | 726/2 |
| 7,154,555 B2 | 12/2006 | Conklin | |
| 7,173,391 B2 * | 2/2007 | Jones et al. | 318/568.12 |
| RE39,644 E * | 5/2007 | Alcorn et al. | 380/251 |
| 7,372,839 B2 * | 5/2008 | Relan et al. | 370/338 |
| 7,663,701 B2 | 2/2010 | de Garrido et al. | |
| 7,792,297 B1 * | 9/2010 | Piccionelli et al. | 380/258 |
| 7,880,631 B1 * | 2/2011 | Herz | 340/652 |
| 2002/0069420 A1 * | 6/2002 | Russell et al. | 725/92 |
| 2002/0154777 A1 * | 10/2002 | Candelore | 380/258 |
| 2003/0097563 A1 * | 5/2003 | Moroney et al. | 713/170 |
| 2004/0068744 A1 * | 4/2004 | Claussen et al. | 725/81 |
| 2004/0162673 A1 * | 8/2004 | Murray et al. | 701/210 |
| 2004/0252201 A1 | 12/2004 | Meitav et al. | |
| 2005/0078215 A1 | 4/2005 | Swartz | |
| 2005/0289585 A1 * | 12/2005 | Pedlow et al. | 725/29 |
| 2006/0107285 A1 * | 5/2006 | Medvinsky | 725/25 |
| 2006/0271949 A1 * | 11/2006 | Perry et al. | 725/25 |
| 2006/0285010 A1 | 12/2006 | Wang et al. | |
| 2007/0002169 A1 | 1/2007 | Munsil et al. | |
| 2007/0126573 A1 * | 6/2007 | Valania | 340/539.13 |
| 2008/0226070 A1 * | 9/2008 | Herz | 380/258 |
| 2009/0210916 A1 * | 8/2009 | Lajoie et al. | 725/98 |

OTHER PUBLICATIONS

U.S. Appl. No. 11/685,102, filed Mar. 12, 2007.
Non-Final Office Action from U.S. Appl. No. 11/685,102, dated Feb. 16, 2011.
Non-Final Office Action from U.S. Appl. No. 11/685,102, dated Oct. 3, 2011.
Final Office Action from U.S. Appl. No. 11/685,102, dated Jun. 8, 2011.
Advisory Action from U.S. Appl. No. 11/685,102, dated Aug. 30, 2011.

* cited by examiner

*Primary Examiner* — Scott Beliveau
*Assistant Examiner* — Alexander Q Huerta
(74) *Attorney, Agent, or Firm* — Zilka-Kotab, PC

(57) ABSTRACT

A system, method and computer program product are provided. In use, a plurality of coordinates of a set top box is identified. In addition, a policy associated with usage of the set top box is enforced utilizing the coordinates.

30 Claims, 4 Drawing Sheets

COORDINATE-BASED SET TOP BOX POLICY ENFORCEMENT SYSTEM, METHOD AND COMPUTER PROGRAM PRODUCT

FIELD OF THE INVENTION

The present invention relates to set top boxes, and more particularly to techniques for enforcing set top box usage policies.

BACKGROUND

In the past, people have received broadcasts, such as radio and television broadcasts, from transmission towers broadcasting signals over the air. Such traditional broadcasts have generally only required people to utilize antennas in conjunction with output devices (e.g. television, radio, etc.) in order to receive such broadcasts, without requiring payment and/or subscriptions to the associated broadcasting service.

Lately, more options for receiving broadcasts have become available. For example, people ma receive broadcasts via cable transmission, satellite transmission, etc. Typically, such broadcasts are received utilizing set top boxes, such as cable boxes, satellite dish systems, etc. Further, such broadcasting options are currently provided only on a payment basis (e.g. monthly, yearly, etc.) to a particular location associated with a subscription.

Thus, there is unfortunately an incentive for people to circumvent the requirement of paying for a broadcasting service at more than one location. Specifically, people may utilize a single set top box in multiple locations (e.g. multiple homes, etc.) in order to eliminate additional costs associated with multiple set top boxes and associated subscriptions to a broadcasting service.

SUMMARY

A system, method and computer program product are provided. In use, a plurality of coordinates of a set top box is identified. In addition, a policy associated with usage of the set top box is enforced utilizing the coordinates.

DETAILED DESCRIPTION

Figure 1:
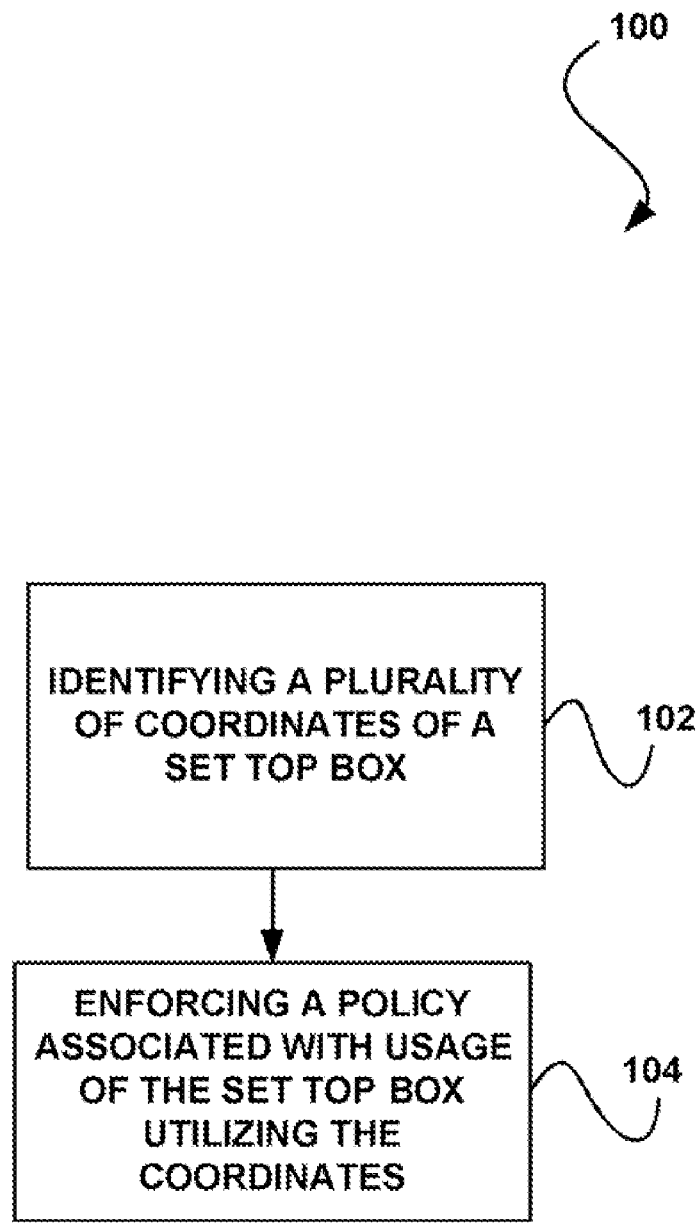
FIG. 1 shows a method for enforcing a policy associated with a set top box utilizing coordinates, in accordance with one embodiment.

FIG. 1 shows a method 100 for enforcing a policy associated with a set top box utilizing coordinates, in accordance with one embodiment. As shown in operation 102, a plurality of coordinates of a set top box is identified. In the context of the present description, the set top box may include any device capable of receiving content (e.g. television content, radio content, internet content, etc.). In one embodiment, the set top box may also optionally include the structure described below with respect to FIG. 4.

In one optional embodiment, the set top box may include a device adapted for receiving content via a satellite content provider. For example, the set top box may include or be connected to a satellite dish, XM radio device, a digital video recorder (DVR), etc. Thus, the set top box may receive television content, radio content, and/or any other content by way of a satellite.

In another optional embodiment, the set top box may include a device adapted for receiving content via a cable content provider. For example, the set top box may include or be connected to a cable box, a DVR, etc. In this way, the set top box may receive television content, radio content, and/or any other content by way of a cable medium. Of course, however, the set top box may include any device capable of receiving content, as mentioned earlier.

Further, the coordinates of the set top box may include elevation, latitude, longitude and/or any other type of coordinates capable of identifying a location of the set top box. In addition, the coordinates may be identified utilizing a global positioning system (GPS). Of course, however, the coordinates may be identified in any desired manner (e.g. by way of triangulation, etc.).

A policy associated with usage of the set top box is then enforced utilizing the coordinates, as shown in operation 104. In the context of the present description, the policy may include any rule, principle, guideline, etc. associated with usage of the set top box. As an option, the policy may be set by a service provider that provides service to the set top box.

In one optional embodiment, the policy may be based on a subscription of a user of the set top box with respect to the service provider. For example, the user may subscribe to a particular service plan provided by the service provider. Of course, the policy may also be based on any other desired criteria, be static and/or dynamic in nature, etc.

In another embodiment, the policy may indicate at least one location in which the set top box may be utilized. For example, the policy may be associated with at least one set of coordinates in which the set top box may be utilized. The policy may also include a predetermined perimeter (e.g. radius of coordinates, etc.) with respect to a single location. In one embodiment, such predetermined perimeter may be sized to reflect an average or maximum room and/or home size. In other embodiments, the policy may involve various coordinate gradients (e.g. an authorized threshold regarding a rate of change in the coordinates over time, etc.).

Furthermore, the location(s) in which the set top box may be utilized can be determined based on a user registration of the set top box. One example of such registration will be described in further detail with respect to FIG. 3. As another option, the location(s) may be determined by the service provider. Of course, however, the location(s) may be determined in any desired manner.

Strictly as an option, in addition to the aforementioned location(s), the policy may include a limit on functionality of the set top box. Just by way of example, the policy may include a rule, principle, guideline, etc. regarding a length of time the set top box may be used. The policy may also include particular content that may be received utilizing the set top box (e.g. channels, stations, web pages, etc.), etc.

Still yet, the policy may also include one or more actions to be taken in response to a violation of the policy. For example, the actions may include a notification, termination of service, termination of a portion of functionality, and/or any other action capable of being taken in response to the detection of a policy violation. To this end, the policy may be enforced in any desired way that utilizes the identified coordinates associated with the set top box.

In one embodiment, the policy may be enforced if the identified coordinates are outside an authorized location in which the set top box may be utilized, as determined by the policy. Just by way of example, service to the set top box may be automatically terminated if the policy is violated. As another example, particular functionality of the set top box may be terminated if the policy is violated. As yet another example, a notification may be provided if the policy is violated.

In still other embodiments, location-specific policies may be implemented. For example, various programming (e.g. sports, etc.) may be "blacked-out" as a function of the coordinates, etc. In this way, a usage-related policy of the set top box may be enforced utilizing coordinates of the set top box.

More illustrative information will now be set forth regarding various optional architectures and uses of different embodiments in which the foregoing method 100 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
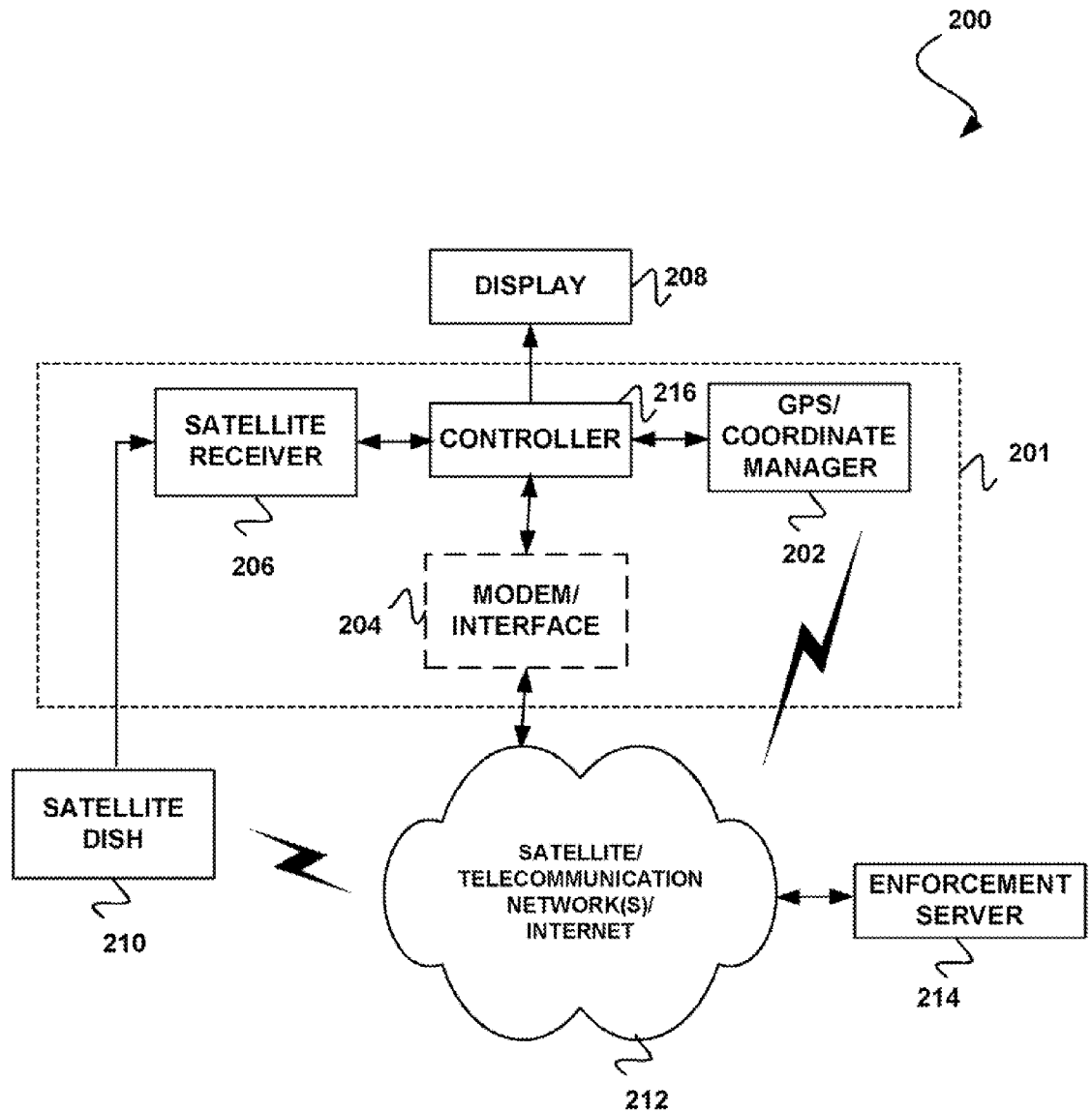
FIG. 2 shows a system for enforcing a policy associated with a set top box utilizing coordinates, in accordance with another embodiment.

FIG. 2 shows a system 200 for enforcing a policy associated with a set top box utilizing coordinates, in accordance with another embodiment. As an option, the system 200 may be implemented in accordance with the method 100 of FIG. 1. Of course, however, the system 200 may be carried out in any desired environment. Further, the aforementioned definitions may equally apply to the description below.

As shown in the current embodiment, a set top box 201 is included for receiving content from a satellite dish 210. While a satellite set top box 201 is set forth and described, it should be noted that the set top box 201 may include any device capable of receiving and/or playing back content. For example, the various features set forth herein may be applied in other embodiments that include any of the set top boxes described above with respect to FIG. 1.

As also shown, the set top box 201 may also be connected with at least one network 212 via a network interface 204 (e.g. modem, Ethernet connection, etc.). The network(s) 212 may include, for example, a satellite network, a telecommunications network, a local area network (LAN), a wireless network, a wide area network (WAN) such as the Internet, a peer-to-peer network, a WiMAX network, a cable network, etc. Thus, the set top box 201 may be capable of sending and receiving information over the network(s) 212. In addition, the set top box 201 may receive content from the satellite dish 210. This may be accomplished utilizing a satellite receiver 206 within the set top box 201.

During normal use, a controller 216 may control the set top box 201 to output the content via the satellite receiver 206 and satellite dish 210, utilizing a display 208. The controller 216 may also receive current coordinates associated with the set top box 201 from a GPS/coordinate manager 202 located within or externally coupled to the set top box 201. The current coordinates may include a precise location of the set top box 201, at a given instant.

In various embodiments, the GPS/coordinate manager 202 may periodically identify the current coordinates of the set top box 201. For example, the GPS/coordinate manager 202 may, under the direction of the controller 216, identify the current coordinates of the set top box 201 according to predetermined time periods (e.g. one second, etc.). As another option, the GPS/coordinate manager 202 may identify the current coordinates of the set top box 201 each time the set top box 201 is powered on.

Furthermore, in one embodiment, the GPS/coordinate manager 202 may further store a set of authorized coordinates. In particular, the GPS/coordinate manager 202 may optionally receive and store authorized coordinates during a registration (e.g. initialization, etc.) of the set top box 201. One example of such registration will be described hereinafter in greater detail.

Of course, in other embodiments, the authorized coordinates may be stored at an enforcement server 214 by way of the network 212. Such enforcement server 214 may optionally be associated with a service provider that authorizes and provides service to such set top box 201. In any case, the authorized coordinates serve to indicate where the set top box 201 is authorized to be located and functioning.

In still other embodiments, the set top box 201 may be equipped with the authorized coordinates at an authorized location. For example, such authorized location may include a store where the set top box 201 and/or associated service is purchased. Further, the coordinates may be inferred from an address of a purchaser. Thus, the set top box 201 need not necessarily communicate with the enforcement server 214, in the present embodiment.

Before use, a registration procedure may be carried out to register (e.g. initialize, etc.) the set top box 201. Specifically, the set top box 201 may be registered automatically when the set top box 201 is first connected to the satellite dish 210, and/or the enforcement server 214 via the network interface 204. The set top box 201 may also be registered upon a user calling a service provider to setup the set top box 201, and/or upon a user manually initiating the registration procedure via a graphical user interface (GUI) of the set top box 201 which relays information over the network 212 via the network interface 204.

Specifically, the registration may involve the identification of the authorized coordinates associated with a location of the set top box 201. The authorized coordinates may be identified utilizing the GPS/coordinate manager 202, and may further include the current coordinates at the time of registration. Of course, however, the authorized coordinates may be identified in any desired manner. For example, an authorized address entered by the user (e.g. via the aforementioned GUI, etc.) may be translated into the authorized coordinates. Further, as mentioned before, the authorized coordinates may be stored in the GPS/coordinate manager 202 and/or enforcement server 214.

As an option, the registration procedure may also include verifying the coordinates. For example, input may be received from a user for verifying that such coordinates identify the location in which the set top box 201 is to be used. As another option, if the coordinates are not verified, the set top box 201 may not be registered and may therefore remain non-functional.

In various embodiments, multiple sets of additional authorized coordinates may optionally be identified during the registration procedure. Such additional authorized coordinates may be identified based on the original authorized coordinates. Just by way of example, the additional authorized coordinates may be identified based on a policy associated with the set top box 201.

In one example, the additional authorized coordinates may include coordinates within a predetermined perimeter surrounding the original authorized coordinates. In another example, the additional authorized coordinates may include manually entered coordinates. Still yet, the additional authorized coordinates may be representative of multiple mutually exclusive locations where use of the set top box 201 is authorized. Of course, however, the additional authorized coordinates may be identified in any desired manner.

By this design, the controller 216 may therefore compare the current coordinates received from the GPS/coordinate manager 202 with the previously stored authorized coordinates. If the current coordinates resides outside the authorized coordinates, various actions may be performed. Just by way of example, service to the set top box 201 may be terminated. More information regarding such enforcement will be set forth hereinafter in greater detail during reference to FIG. 3.

In other embodiments, multiple set top boxes may exist, namely a master set top box and one or more slave set top boxes. In such embodiment, the coordinates of the set top boxes may be compared. To this end, a relative distance, position, etc. of the master/slave set top boxes may be used for policy enforcement. Of course, similar functionality may be afforded without the set top boxes necessarily taking on a master-slave relationship.

In this way, the system 200 only permits the set top box 201 to function within an authorized area. Thus, any incentive for theft of the set top box 201 may be eliminated. In addition, circumvention of service policies by utilizing the set top box 201 in multiple areas may be prevented.

Further, in other embodiments, domestic enforcement may be afforded (to prevent use outside a predetermined state, country, etc). In still yet additional embodiments where multiple set top boxes coexist, an associated policy may provide a diversity of programming on such units. For example, one set top box may be capable of presenting adult content while another one may not, etc.

Figure 3:
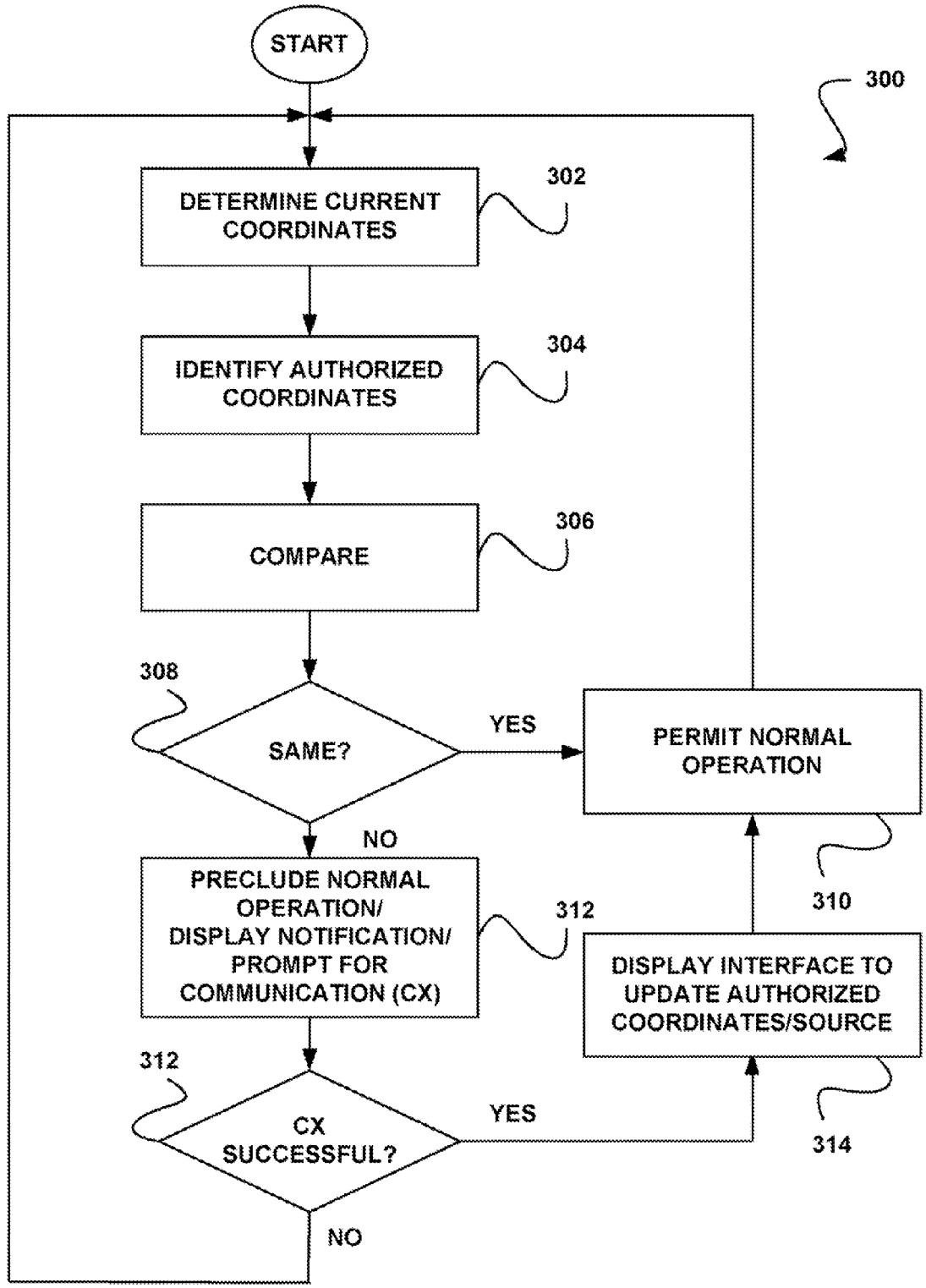
FIG. 3 shows a method for enforcing a policy associated with a set top box utilizing coordinates, in accordance with yet another embodiment

FIG. 3 shows a method 300 for enforcing a policy associated with a set top box utilizing coordinates, in accordance with yet another embodiment. As an option, the method 300 may be implemented in the context of the details of FIGS. 1 and/or 2. Of course, however, the method 300 may be carried out in any desired environment. Further, the aforementioned definitions may equally apply to the description below.

Once the set top box is registered with the authorized coordinates defined, the set top box may be utilized by a user for receiving content. At any desired time, current coordinates of the set top box are determined, as shown in operation 302. As an option, the current coordinates may be determined upon each power up of the set top box. As another option, the current coordinates may be determined periodically based on predetermined time periods.

Further, a plurality of authorized coordinates is identified, as shown in operation 304. The authorized coordinates may, in various embodiments, be identified in local memory within the set top box, or via a remote server. Thus, the current coordinates and the authorized coordinates may then be compared, as shown in operation 306. In one embodiment, the current coordinates and the authorized coordinates may be compared by the set top box. Thus, if the comparison is performed by the set top box and if the set top box does not have the authorized coordinates stored thereon, the authorized coordinates may be transmitted to the set top box from a remote server for comparison.

In another embodiment, the current coordinates and the authorized coordinates may be compared by a server separate from the set top box. In addition, the current coordinates may be transmitted to the server (where the authorized coordinates reside) for performing the comparison. Of course, it should be noted that the current coordinates and the authorized coordinates may be compared by any desired device capable of performing such comparison.

Next, it is determined whether the current coordinates are the same as any of the authorized coordinates, as shown in decision 308. If the current coordinates are determined to be the same as at least one of the authorized coordinates (or within a predetermined level of error, etc.), normal operation of the set top box is permitted. Note operation 310. Thus, usage of the set top box may be conditionally permitted based on the comparison.

If, however, the current coordinates are not determined to be the same as any of the authorized coordinates, normal functionality of the set top box may be temporarily terminated and a notification may be displayed along with a prompt for a communication, as shown in operation 312. Specifically, the notification may be displayed to a user of the set top box. Further, the notification may inform the user that the set top box is outside of its authorized operating area. Still yet, the notification may inform the user of the authorized operating area based on the authorized coordinates.

Additionally, the prompted communication may include any communication to be sent from the set top box to a remote server. For example, the communication may include a call, a data transmission (e.g. e-mail, website interaction, etc.) via any integrated or separate interface, etc. Further, the communication may, in one embodiment, be predicated on entry of appropriate log-in information (e.g. user name, password, etc.).

In another embodiment, at least one authorized source of the communication may be identified. The authorized source may include any predetermined source (e.g. port, internet protocol address, phone number, e-mail address, etc.) from which the user of the set top box is authorized to communicate. In such embodiment, the authorized source may be one of a plurality of authorized sources stored within the set top box and/or a separate server. In addition, the authorized source may be defined by the user and/or the service provider at the time of registration of the set top box, for example.

It is then determined whether the communication was successful, as shown in decision 312. Such a determination may be made by verifying the log-in information, comparing the authorized source of the communication with an actual source of the communication, etc. Specifically, in the latter embodiment, the aforementioned ports, internet protocol addresses, phone numbers, etc. may be compared. Of course, however, the success of the communication may be determined in any desired manner.

If it is determined that the communication was not successful (e.g. that the comparison was not successful) per decision 312, normal operation of the set top box may be continuously precluded. Moreover, service may only be resumed once it is determined that the set top box is located within the authorized area.

If, however, it is determined that the communication was successful, a GUI may be displayed to the user utilizing the set top box in order to update authorized coordinates and/or sources associated with the set top box. Note operation 314. Just by way of example, the GUI may enable the user to re-register the set top box with a new set of authorized coordinates and/or sources. In this way, a user may be permitted to change authorized coordinates and/or sources associated with a set top box.

Optionally, the authorized coordinates and/or sources may only be allowed to be updated a predetermined number of times. For example, the authorized coordinates and/or sources may be allowed to be updated once a year, once every three years, two times total, etc. In one embodiment, the service provider may define the number of times the authorized coordinates and/or sources may be updated. To this end, normal operation of the set top box may be permitted upon such update, as shown in operation 310.

Figure 4:
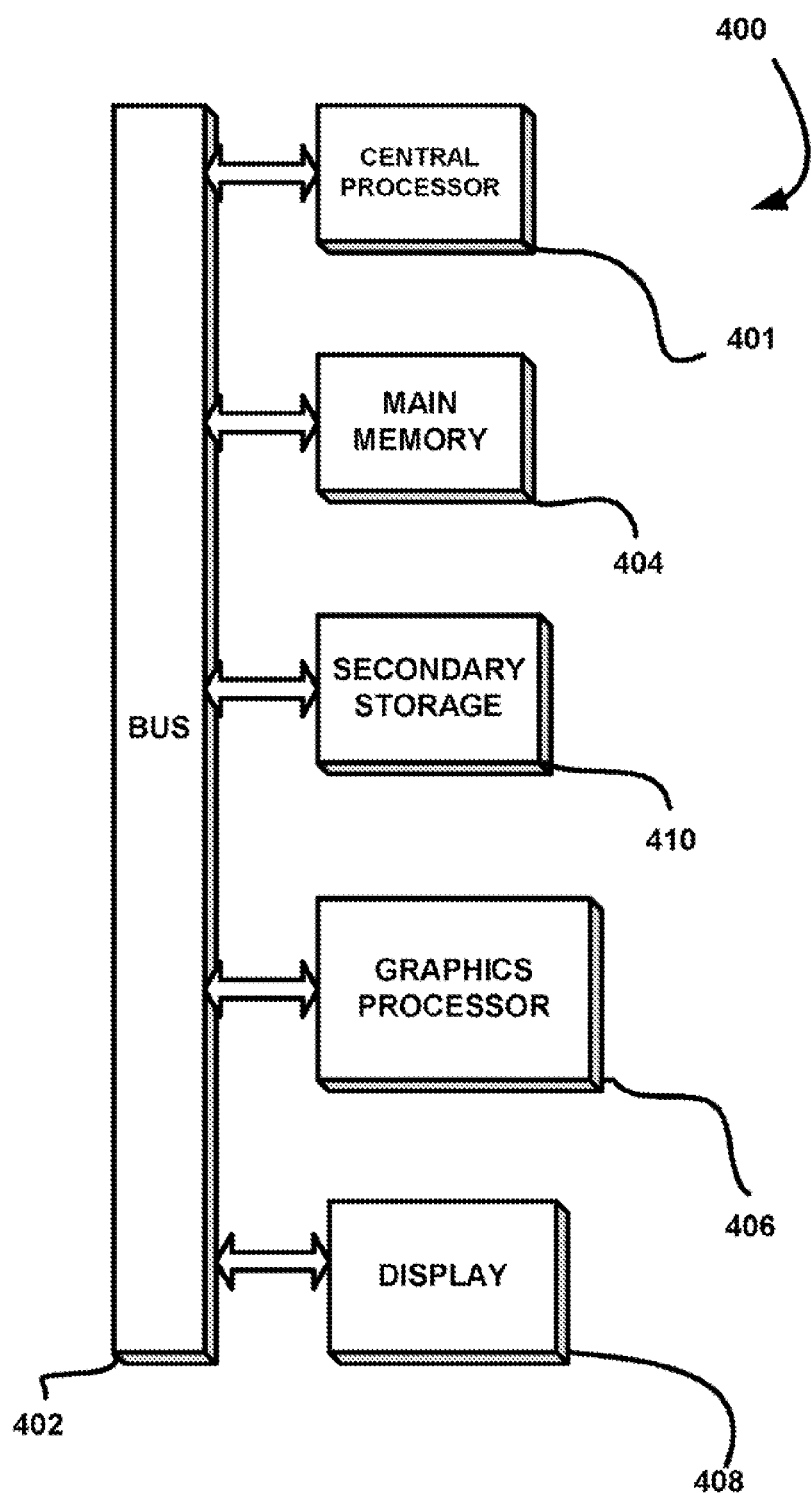
FIG. 4 illustrates an exemplary system with which the various embodiments may be implemented, in accordance with one embodiment.

FIG. 4 illustrates an exemplary system 400, in accordance with one embodiment. As an option, the enforcement server 214 of FIG. 2 may take the form of the system 400. In other embodiments, the set top box 201 of FIG. 2 may be modeled after the system 400 but, of course, may be also equipped with the additional components shown in FIG. 2 (e.g. receiver, GPS/coordinate manager, etc.).

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a first plurality of coordinates of a set top box;
   storing at the set top box, the first plurality of coordinates as an authorized source of communication;
   transmitting to a remote server, the first plurality of coordinates stored as the authorized source of communication;
   identifying a second plurality of coordinates of the set top box as an actual source of communication; and
   enforcing a policy associated with usage of the set top box utilizing the first plurality of coordinates transmitted to the remote server, the enforcing the policy including:
      determining that the first plurality of coordinates stored at the set top box as the authorized source of communication are no longer stored at the set top box,
      receiving at the set top box, in response to the determination that the first plurality of coordinates stored at the set top box are no longer stored at the set top box, replacement coordinates from the remote server, the replacement coordinates being a copy of the first plurality of coordinates transmitted to the remote server,
      comparing the replacement coordinates received from the remote server to the coordinates of the actual source of communication, and
      conditionally displaying an interface if the comparison indicates that the coordinates of the actual source of the communication reside within the replacement coordinates received from the remote server, the interface permitting the authorized source of communication to be updated;
   wherein multiple set top boxes exist, and coordinates of the multiple set top boxes are compared to each other;
   wherein the multiple set top boxes include a master set top box and at least one slave set top box, and a relative distance of the master set top box and each slave set top box is calculated based on a comparison of coordinates of the master set top box and coordinates of the at least one slave set top box, such that the coordinate-based relative distance calculation of the master set top box and each slave set top box is used for policy enforcement.

2. The method of claim 1, wherein the first plurality of coordinates are identified utilizing a global positioning system.

3. The method of claim 1, wherein the set top box is adapted for receiving content via a satellite content provider.

4. The method of claim 1, wherein the set top box is adapted for receiving content via a cable content provider.

5. The method of claim 1, wherein the enforcing further includes conditionally permitting usage of the set top box based on the comparison.

6. The method of claim 5, wherein the usage is only permitted if the coordinates of the actual source of the communication reside within the replacement coordinates received from the remote server.

7. The method of claim 1, wherein the enforcing further includes displaying a notification to a user of the set top box based on the comparison.

8. The method of claim 7, wherein the notification is displayed along with a prompt for a communication.

9. The method of claim 7, wherein the notification informs the user that the set top box is outside of an authorized operating area and further informs the user of the authorized operating area based on the authorized source of communication.

10. The method of claim 1, wherein the policy includes a predetermined perimeter with respect to a single location.

11. The method of claim 10, wherein the predetermined perimeter is a radius of coordinates.

12. The method of claim 10, wherein the predetermined perimeter is sized to reflect an average size of a home.

13. The method of claim 10, wherein the predetermined perimeter is sized to reflect a maximum size of a home.

14. The method of claim 1, wherein the policy includes an authorized threshold regarding a rate of change in the coordinates of the actual source of the communication over time.

15. The method of claim 1, wherein the policy includes a limit on functionality of the set top box.

16. The method of claim 1, wherein the policy includes a rule regarding a length of time the set top box may be used.

17. The method of claim 1, wherein sports programming is "blacked-out" as a function of the coordinates.

18. The method of claim 1, wherein a position of the multiple set top boxes is used for the policy enforcement.

19. The method of claim 1, wherein the interface enables a user to re-register the set top box with a new set of coordinates as the authorized source of communication, such that the authorized source of communication is updated using the interface.

20. The method of claim 19, wherein the authorized source of communication is only allowed to be updated once a year.

21. The method of claim 1, wherein the authorized source of the communication and the actual source of the communication each include at least one of an internet protocol address, a port, and a phone number.

22. The method of claim 1, wherein the second plurality of coordinates are identified upon each power up of the set top box.

23. The method of claim 1, wherein the second plurality of coordinates are identified periodically based on predetermined time periods.

24. The method of claim 1, wherein the authorized source of communication is only allowed to be updated a predetermined number of times defined by a service provider.

25. The method of claim 1, wherein the first plurality of coordinates of the set top box are already established at a time of purchase of the set top box.

26. The method of claim 25, wherein the first plurality of coordinates of the set top box are established based on a location from which the set top box is purchased.

27. The method of claim 1, wherein the first plurality of coordinates of the set top box are established based on a location at which a service for the set top box is purchased.

28. The method of claim 1, wherein the first plurality of coordinates of the set top box are established based on an address of a user of the set top box.

29. A computer program product embodied on a non-transitory computer readable medium, comprising:
   computer code for identifying a first plurality of coordinates of a set top box;
   computer code for storing at the set top box, the first plurality of coordinates as an authorized source of communication;
   computer code for transmitting to a remote server, the first plurality of coordinates stored as the authorized source of communication;
   computer code for identifying a second plurality of coordinates of the set top box as an actual source of communication; and
   computer code for enforcing a policy associated with usage of the set top box utilizing the first plurality of coordinates transmitted to the remote server, the enforcing the policy including:
      determining that the first plurality of coordinates stored at the set top box as the authorized source of communication are no longer stored at the set top box,
      receiving at the set top box, in response to the determination that the first plurality of coordinates stored at the set top box are no longer stored at the set top box, replacement coordinates from the remote server, the replacement coordinates being a copy of the first plurality of coordinates transmitted to the remote server,
      comparing the replacement coordinates received from the remote server to the coordinates of the actual source of communication, and
      conditionally displaying an interface if the comparison indicates that the coordinates of the actual source of the communication reside within the replacement coordinates received from the remote server, the interface permitting the authorized source of communication to be updated;
   wherein multiple set top boxes exist, and the computer program product is operable such that coordinates of the multiple set top boxes are compared to each other;
   wherein the multiple set top boxes include a master set top box and at least one slave set top box, and the computer program product is operable such that a relative distance of the master set top box and each slave set top box is calculated based on a comparison of coordinates of the master set top box and coordinates of the at least one slave set top box, such that the coordinate-based relative distance calculation of the master set top box and each slave set top box is used for policy enforcement.

30. A system, comprising:
   a global position sub-system for:
      identifying a first plurality of coordinates of a set top box,
      storing at the set top box, the first plurality of coordinates as an authorized source of communication, and
      identifying a second plurality of coordinates of the set top box as an actual source of communication;
   a transmitter for transmitting to a remote server, the first plurality of coordinates stored as the authorized source of communication; and
   a controller for controlling usage of the set top box utilizing the first plurality of coordinates transmitted to the remote server, the controlling usage of the set top box including:
      determining that the first plurality of coordinates stored at the set top box as the authorized source of communication are no longer stored at the set top box,
      receiving at the set top box, in response to the determination that the first plurality of coordinates stored at the set top box are no longer stored at the set top box, replacement coordinates from the remote server, the replacement coordinates being a copy of the first plurality of coordinates transmitted to the remote server,
      comparing the replacement coordinates received from the remote server to the coordinates of the actual source of communication, and
      conditionally displaying an interface if the comparison indicates that the coordinates of the actual source of the communication reside within the replacement coordinates received from the remote server, the interface permitting the authorized source of communication to be updated;
   wherein multiple set top boxes exist, and the system is operable such that coordinates of the multiple set top boxes are compared to each other;
   wherein the multiple set top boxes include a master set top box and at least one slave set top box, and the system is operable such that a relative distance of the master set top box and each slave set top box is calculated based on a comparison of coordinates of the master set top box and coordinates of the at least one slave set top box, such that the coordinate-based relative distance calculation of the master set top box and each slave set top box is used for policy enforcement.

* * * * *